(12) United States Patent
Uchida et al.

(10) Patent No.: US 6,478,481 B2
(45) Date of Patent: Nov. 12, 2002

(54) SCREENING MECHANISM FOR OPTICAL FIBER FUSION-SPLICER

(75) Inventors: Takaaki Uchida; Hideki Watanabe, both of Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/837,078

(22) Filed: Apr. 18, 2001

(65) Prior Publication Data

US 2001/0041035 A1 Nov. 15, 2001

Related U.S. Application Data

(63) Continuation of application No. PCT/JP00/06019, filed on Sep. 5, 2000.

(30) Foreign Application Priority Data

Sep. 9, 1999 (JP) .......................................... 11-256017

(51) Int. Cl.[7] .............................................. G02B 6/255
(52) U.S. Cl. ...................................... 385/96; 385/135
(58) Field of Search ..................... 385/96–98, 134–137; 356/73.1

(56) References Cited

U.S. PATENT DOCUMENTS

| | | | | |
|---|---|---|---|---|
| 5,002,351 A | * | 3/1991 | Szanto et al. .................. 385/96 |
| 5,191,632 A | * | 3/1993 | Mansfiled et al. ........... 385/134 |
| 5,353,366 A | * | 10/1994 | Bossard ...................... 385/134 |
| 5,524,163 A | * | 6/1996 | Kobayashi et al. ............ 385/96 |
| 5,596,672 A | * | 1/1997 | Harman et al. .............. 385/147 |
| 5,611,015 A | * | 3/1997 | Tokumaru et al. ............. 385/98 |
| 5,961,865 A | * | 10/1999 | Esmaeili et al. ............. 219/383 |
| 6,088,503 A | * | 7/2000 | Chandler et al. ............ 385/135 |
| 6,190,057 B1 | * | 2/2001 | Osaka et al. ................... 385/96 |
| 6,206,583 B1 | * | 3/2001 | Hishikawa et al. ............ 385/96 |

FOREIGN PATENT DOCUMENTS

| | | |
|---|---|---|
| JP | 2-98310 | 8/1990 |
| JP | 9-127357 | 5/1997 |
| JP | 11-174263 | 7/1999 |

* cited by examiner

*Primary Examiner*—Rodney Bovernick
*Assistant Examiner*—Michelle R. Connelly-Cushwa
(74) *Attorney, Agent, or Firm*—Knobbe, Martens, Olson & Bear LLP

(57) ABSTRACT

The present invention provides a screening mechanism for an optical fiber fusion-splicer including two holder tables for holding two optical fibers to be fusion-spliced in an opposed relationship, a connection table disposed between the holder tables and having guide grooves into which tip end portions, from which coatings are removed, of the two optical fibers held by the holder tables are fitted, and fiber clamps adapted to press the tip end portions of the optical fibers into the guide grooves, the screening mechanism comprising a sensor capable of detecting the fact that the pressing of the tip end portions of the optical fibers effected by the fiber clamps is released, and wherein, when the releasing is detected by the sensor, one or both of the holder tables are automatically shifted in directions opposite to optical fiber abutting directions to pull the optical fibers, thereby effect screening.

3 Claims, 4 Drawing Sheets

SCREENING MECHANISM FOR OPTICAL FIBER FUSION-SPLICER

This application is a continuation of International Application No. PCT/JP00/06019 filed at the Japanese Receiving Office on Sep. 5, 2000. The International Application was published as Publication No. WO 01/20378 A1 in the Japanese language on Mar. 22, 2001.

BACKGROUND OF THE INVENTION

1. Field of the Invention

The present invention relates to an automatic screening mechanism used with an optical fiber fusion-splicer in which exposed ends (from which coating are removed) of two optical fibers aligned with each other in an axial direction are butted and two fibers are integrally fused by heating a butted portion, and more particularly, it relates to an automatic screening mechanism for ascertaining strength of a fused portion by pulling the optical fibers in directions opposite to abutting directions after fusion-splice.

2. Related Background Art

In general, an optical fiber fusion-splicer includes a screening mechanism for ascertaining strength (screening) of a fused portion by effecting a tensile test after two optical fibers are fusion-spliced. In recent years, in answer to requirements of compactness and simple construction of the optical fiber fusion-splicer, there has widely been proposed an optical fiber fusion-splicer in which the screening is performed by utilizing driving mechanism for shifting the optical fibers to align two optical fibers with each other and/or to abut tip ends of the optical fibers against each other. An example of such an optical fiber fusion-splicer is shown in FIG. 6.

The optical fiber fusion-splicer shown in FIG. 6 comprises two fiber holders C on which two optical fibers B having exposed tip end portions A (from which coating are removed) for fusion-splice are set, two holder tables D on which the fiber holders C are mounted, a connection table F having V-shaped grooves E into which the tip end portions A of the optical fibers B set on the fiber holders C are fitted, and fiber clamps G for pressing the tip end portions A of the optical fibers B fitted in the V-shaped grooves E from the above, thereby fixing the tip end portions in the grooves. In this machine, the holder tables D are shifted by driving mechanisms (not shown) in directions shown by the arrows a to abut the tip end portions A of the optical fibers B, and, after the butted tip end portions A of the optical fibers B are fitted into the V-shaped grooves E of the connection table F, the fiber clamps G waiting at positions (waiting positions) shown in FIG. 6 are rotated in directions shown by the arrows c to press and fix the tip end portions A in the V-shaped grooves E of the connection table F by means of pressing members K provided on free ends of the fiber clamps G. In this condition, the tip end portions A are fusion-spliced by applying heat, and, thereafter, the fiber clamps G are rotated in directions shown by the arrows d to return them to their waiting positions, and then, the holder tables D are shifted in directions shown by the arrows b to pull the optical fibers B in the same directions. In this way, the screening is effected.

The above-mentioned conventional screening mechanism arose the following problem.

When the screening is effected, it is not required that the tip end portions of the optical fibers are pressed and fixed in the V-shaped grooves by the fiber clamps; to the contrary, if the screening is effected while the tip end portions are being fixed, there arise problems that the optical fibers are damaged and/or, due to excessive force, the optical fibers are broken or connection strength is worsened. To avoid this, it is required that, before the screening is started, the fiber clamps are returned to their waiting positions to release the fixing of the optical fibers. However, in the conventional screening mechanism, initiation of the screening and initiation of the shifting of the holder tables in the directions b are performed manually by the operator, in a condition that the releasing of the fiber clamps is forgotten, the screening may be started. Further, the execution of the screening itself may be forgotten.

SUMMARY OF THE INVENTION

An object of the present invention is to provide a screening mechanism for an optical fiber fusion-splicer, in which, when fixing of tip end portions of optical fibers effected by fiber clamps is released, screening is automatically started, there is no danger of effecting the screening while the optical fibers are fixed by the fiber clamps and there is no danger of forgetting the screening.

According to a first aspect of the present invention, there is provided a screening mechanism for an optical fiber fusion-splicer including two holder tables for holding two optical fibers to be fusion-spliced in an opposed relationship, a connection table disposed between the holder tables and having guide grooves into which tip end portions, from which coatings are removed, of the two optical fibers held by the respective holder tables are fitted, and fiber clamps capable of rotating from their waiting positions to positions above the guide grooves and adapted to press the tip end portions of the optical fibers into the guide grooves, the screening mechanism comprising a sensor capable of detecting the fact that the pressing of the tip end portions of the optical fibers effected by the fiber clamps is released, and wherein, when the releasing is detected by the sensor, one or both of the holder tables are automatically shifted in directions opposite to optical fiber abutting directions to pull the optical fibers thereby effect screening.

According to a second aspect of the present invention, two optical fibers to be fusion-spliced are set on two fiber holders independently, and the fiber holders are mounted on the corresponding holder tables.

According to a third aspect of the present invention, the fact that the pressing of the tip end portions of the optical fibers effected by the fiber clamps is released is detected by detecting the fact that the fiber clamps are returned to their waiting positions.

BEST MODE FOR CARRYING OUT THE INVENTION

First Embodiment

Now, a screening mechanism according to a first embodiment of the present invention will be fully explained with reference to FIG. 1 to 3. The screening mechanism according to the present invention is used with an optical fiber fusion-splicer including holder tables 2, a connection table 5 and fiber clamps 6 and comprises a sensor 7 capable of detecting whether the fiber clamps 6 are returned to their waiting positions or not. When the fact that the fiber clamps 6 which was located at their operating positions during fusion-splice are returned to their waiting positions is detected by the sensor 7, the holder tables 2 are automatically shifted in direction opposite to optical fiber 1 abutting directions to pull optical fibers 1 thereby to effect screening.

Figure 1:
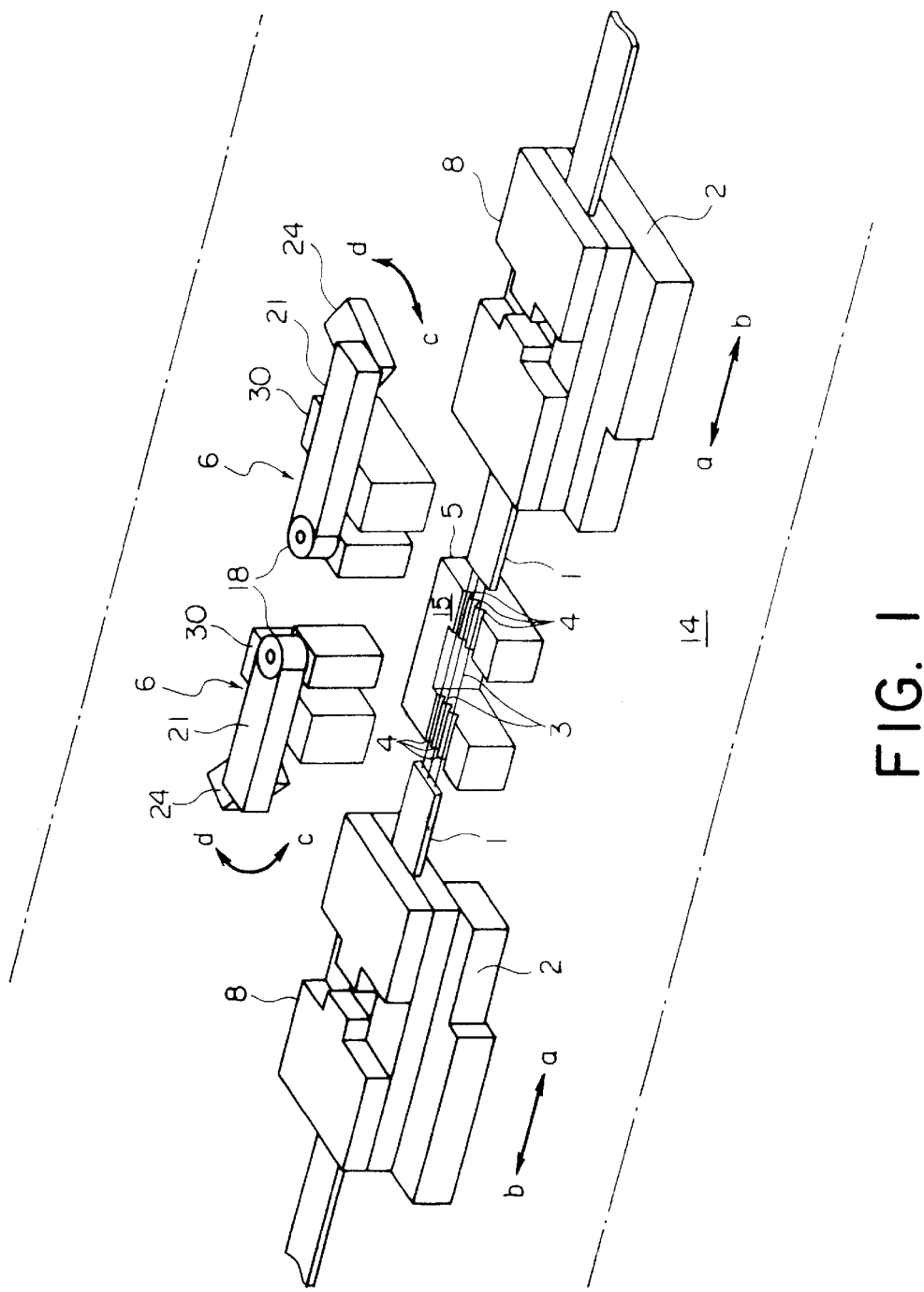
FIG. 1 is a perspective view of a screening mechanism for an optical fiber fusion-splicer, according to a first embodiment of the present invention.

As shown in FIG. 1, each of the holder tables 2 of the optical fiber fusion-splicer is formed as a block on which a fiber holder 8 for setting one of the two optical fibers 1 to be fusion-spliced is mounted. Two holder tables 2 are installed on an upper surface 14 of a body of the connecting machine in an opposed relationship, and the respective holder tables 2 are slidingly shifted by driving mechanisms (not shown) in directions shown by the arrows a, b. Incidentally, in the illustrated embodiment, the optical fibers 1 are multi tape fibers, and, these tape fibers are set on the respective fiber holders 8 in a condition that coatings on tip end portions 3 of cores (of the fibers) to be fusion-spliced are removed from the tip end portions. When the holder tables 2 on which the fiber holders 8 (on which the optical fibers 1 are set) are mounted are slid in the directions shown by the arrows a, the tip end portions 3 of the optical fibers 1 are butted against each other.

As shown in FIG. 1, the connection table 5 is positioned between two opposite holder tables 2, and is designed so that the tip end portions 3 of the two optical fibers 1 butted against each other by sliding the holder tables 2 in the directions shown by the arrows a can be fusion-spliced on the connection table 5. More specifically, the connection table 5 is provided at its upper surface 15 with plural pairs of V-shaped guide grooves 4 aligned with each other in an axial direction, so that, when the tip end portions 3 of the two optical fibers 1 butted against each other are fitted into the guide grooves 4, the tip end portions 3 of the optical fibers 1 are automatically aligned with each other. In this condition, the fusion-splice is effected.

As shown in FIG. 1, the fiber clamps 6 are provided on the upper surface 14 of the body of the fusion-splicer for rotation in directions c, d. Each fiber clamp 6 is constituted by securing one end of an arm 21 to an upper end of a rotary shaft 18 and attaching an pressing member 24 to a lower surface of the arm 21 at its other end. In the illustrated embodiment, as shown in FIG. 1, two fiber clamps 6 are provided to press the aligned tip end portions 3 of the two optical fibers 1 fitted in the two guide grooves 4 of the connection table 5 into the guide grooves 4 from the above, thereby fixing the tip end portions in the guide grooves The fiber clamps 6 are waiting at their waiting positions shown in FIG. 2A until the holder tables 2 on which the fiber holders 8 are mounted are slid in the directions shown by the arrows a in FIG. 1 to abut the tip end portions 3 of the two optical fibers 1 and the butted tip end portions 3 are fitted into the guide grooves 4 of the connection table 5. When the tip end portions 3 of the two optical fibers 1 are fitted into the guide grooves 4 of the connection table 5 and are aligned with each other, the rotary shafts 18 of the fiber clamps 6 are rotated by the driving mechanisms, so that the arms 21 of the two fiber clamps 6 are rotated in the directions shown by the arrows c in FIG. 1 up to positions shown in FIG. 2B (above the guide grooves; operating positions). When the arms 21 are rotated in the operating positions, the rotary shafts 18 are lowered axially by a predetermined amount, with the result that the pressing members 24 provided at the free ends of the arms 21 presses the tip end portions 3 of the optical fibers 1 fitted in the guide grooves 4 of the connection table 5 from the above, thereby fixing the tip end portions in the guide grooves 4. Consequently, the aligned two optical fibers 1 are fixed there, thereby maintaining the alignment of the fibers during the fusion-splice.

Figure 2A:
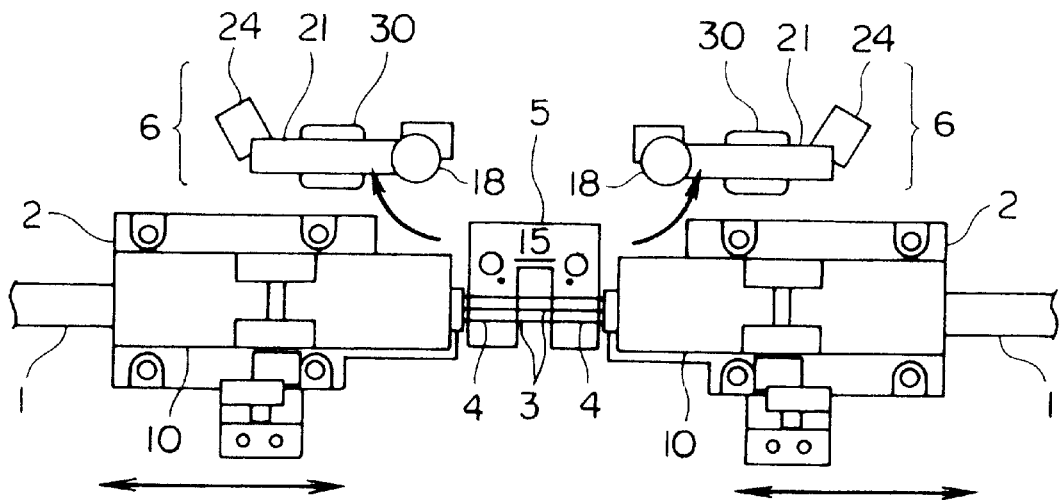
FIG. 2A is a plan view showing a condition that fiber clamps are located at their waiting positions.
Figure 2B:
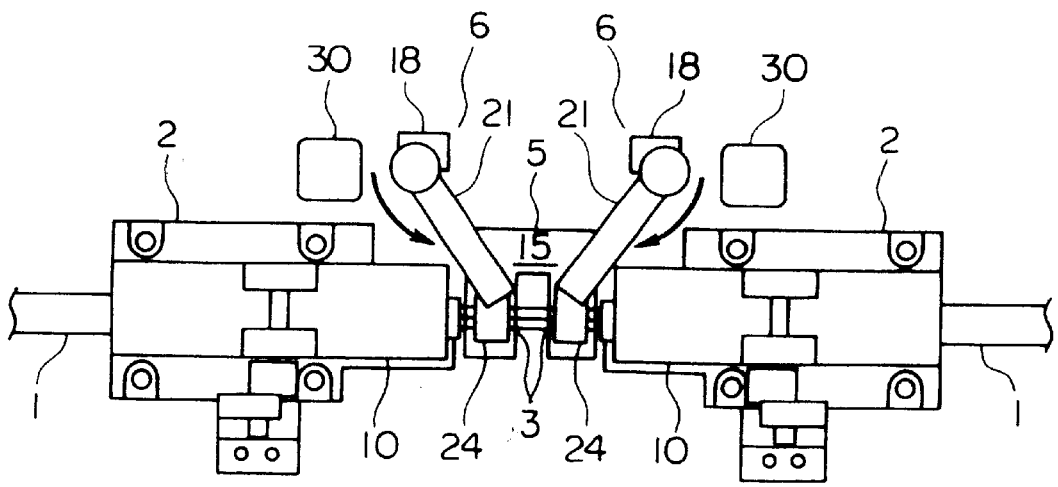
FIG. 2B is a plan view showing a condition that the fiber clamps are located at their operating positions.

When the optical fibers 1 are fixed by the fiber clamps 6, discharging is effected between two discharging electrodes (not shown) opposed with the interposition of the tip end portions 3 of the optical fibers 1, with the result that the two optical fibers 1 are fusion-spliced by the discharging heat. When the fusion-splice is finished, the rotary shafts 18 of the fiber clamps 6 are lifted axially to release the fixing of the tip end portions 3 of the optical fibers 1 effected by the fiber clamps 6, and, thereafter, the rotary shafts 18 are rotated in opposite directions to rotate the arms 21 of the two fiber clamps 6 in the directions shown by the arrows d in FIG. 1 thereby to return the fiber clamps to their waiting positions (FIG. 2A).

Figure 3:
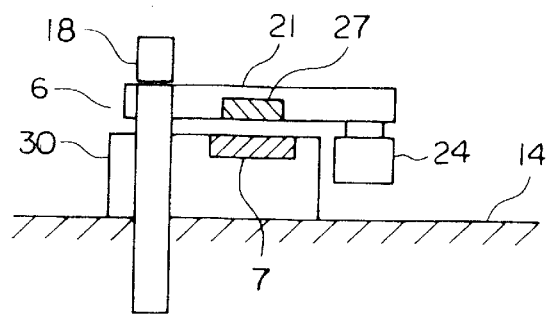
FIG. 3 is a side view showing a condition that the fiber clamp is located at the waiting position.

As shown in FIG. 3, the arm 21 of each fiber clamp 6 is provided at its lower surface with a magnet 27, and a block 30 is disposed below the arm 21 of the fiber clamp 6 extending in the waiting position shown in FIG. 1, and a sensor (magnetic sensor) 7 capable of detecting the magnet 27 attached to the arm 21 is provided on an upper surface of the block 30 (FIG. 3), so that it can be judged whether the fiber clamp 6 is positioned at the waiting position or not. More specifically, when the fiber clamps 6 which were waiting at the waiting positions until the tip end portions 3 of the two optical fibers 1 are fitted into the guide grooves 4 of the connection table 5 and are aligned with each other are rotated in the directions shown by the arrows c in FIG. 1 to shift to the operating positions (FIG. 2B), the magnetic sensors 7 cannot detect the magnets 27 attached to the arms 21, with the result that the sensors are turned OFF. Thereafter, after the fusion-splice is finished, when the fiber clamps 6 are returned to the waiting positions (FIG. 2A), the magnetic sensors 7 detect the magnets attached to the arms 21, with the result that the sensors are turned ON. Accordingly, it can be judged whether the fiber clamps 6 are located at the waiting positions or not in dependence upon ON/OFF of the magnetic sensors 7.

When the magnetic sensors 7 which were OFF are turned ON, the driving mechanisms for sliding the holder tables 2 shift (retard) the holder tables 2 in the directions shown by the arrows b, with the result that the optical fibers 1 mounted on the tables are pulled in the same directions by predetermined forces, thereby effecting the screening. That is to say, after the pressing of the tip end portions 3 of the optical fibers 1 effected by the fiber clamps 6 is released, the screening is performed automatically.

Second Embodiment

Figure 4A:
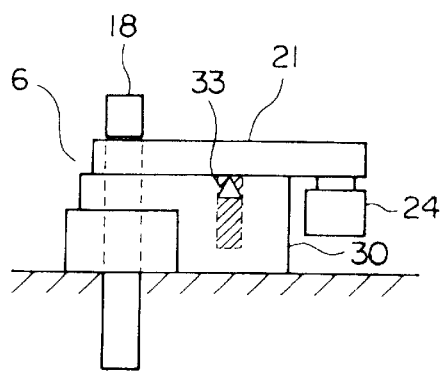
FIGS. 4A and 4B are side views showing a screening mechanism for an optical fiber fusion-splicer, according to a second embodiment of the present invention.
Figure 4B:
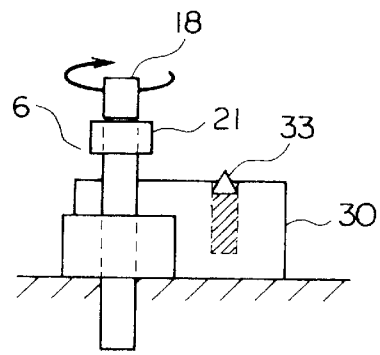

Next, a second embodiment of the present invention will be explained with reference to FIGS. 4A and 4B. A fundamental construction of a screening mechanism shown in FIGS. 4A and 4B is identical to that shown in FIGS. 1 to 3. The difference is that, as shown in FIGS. 4A and 4B, a mechanical switch (for example, a limit switch) 33 is provided on the upper surface of each block 30 so that, when the fiber clamp 6 is returned to the waiting position, the arm 21 of the fiber clamp 6 acts on the switch 33 to turn ON or OFF the switch. When the fiber clamp 6 which was waiting at the waiting position is rotated in the operating position, the arm acts on the limit switch 33 (which was ON or OFF) again to turn OFF or ON the switch. In this way, it can be judged whether the fiber clamps 6 are positioned at the waiting positions or not.

Third Embodiment

Figure 5A:
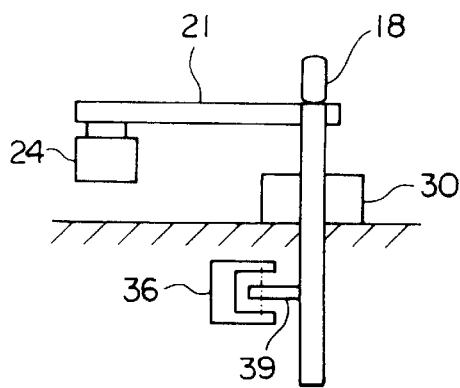
FIGS. 5A and 5B are side views showing a screening mechanism for an optical fiber fusion-splicer, according to a third embodiment of the present invention.
Figure 5B:
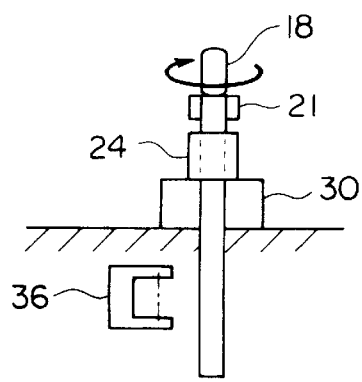
Figure 6:
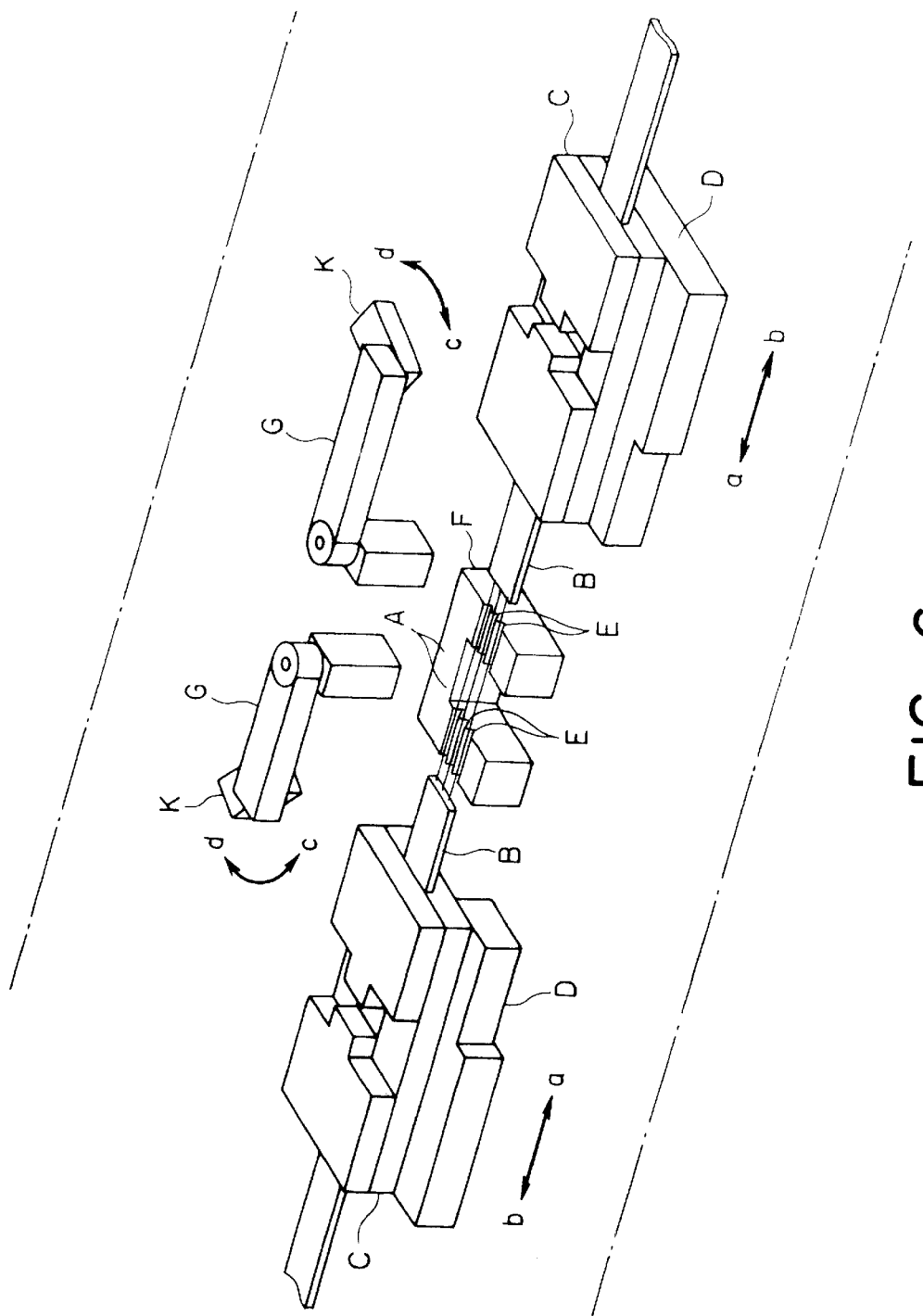
FIG. 6 is a perspective view showing a conventional screening mechanism for an optical fiber fusion-splicer.

Next, a third embodiment of the present invention will be explained with reference to FIGS. 5A and 5B. A fundamental construction of a screening mechanism shown in FIGS. 5A and 5B is identical to that shown in FIGS. 1 to 3. The difference is that, as shown in FIGS. 5A and 5B, the body of the fusion-splicer to which the rotary shaft 18 of each fiber clamp 6 is mounted is provided at its interior with an optical sensor 36 comprising a light emitting element (not shown) and a light receiving element (not shown) for receiving light from the light emitting element so that, when the rotary shaft 18 is rotated, a shield member 39 provided on the rotary shaft 18 passes between the light emitting element and the light receiving element to block the light, thereby detecting rotation of the rotary shaft 18. In this way, it can be judged whether the fiber clamps 6 are positioned at the waiting positions or not.

Other Embodiments

In the above-mentioned embodiments, while an example that, when the fact that the fiber clamps are returned to their waiting positions is detected, the screening is started was explained, it is not necessary that the start of the screening is waiting until the fiber clamps are returned to the waiting positions, but, the screening may be started immediately after the fixing of the tip end portions of the optical fibers effected by the fiber clamps is released. Further, in the above-mentioned embodiments, while an example that the optical fibers are held by the fiber holders independent from the holder tables and the fiber holders are mounted on the holder tables was explained, the fiber holders may be formed integrally with the holder tables. In addition, the optical fiber is not limited to the tape fiber and may be a single-core fiber. Furthermore, the cross-sectional shape of the guide groove of the connection table is not limited to the V-shape.

Industrial Availability

In the screening mechanism for the optical fiber fusion-splicer according to the present invention, since the sensors capable of detecting whether the pressing of the tip end portions of the optical fibers effected by the fiber clamps is released or not, and, when such releasing is detected by the sensors, the holder tables are shifted in the directions opposite to the optical fiber abutting directions to pull the optical fibers thereby to effect the screening automatically, the following advantage can be obtained:

1. Since the screening is not performed before the pressing of the optical fibers effected by the fiber clamps is released, there is no possibility that the optical fibers are damaged or the optical fibers are broken or connection strength is worsened due to excessive force.
2. Since a series of operations from the fusion-splice of the optical fibers to the screening are effected automatically, working efficiency is enhanced.

What is claimed is:

1. A screening mechanism for an optical fiber fusion-splicer including two holder tables for holding two optical fibers to be fusion-spliced in an opposed relationship, a connection table disposed between said holder tables and having guide grooves into which tip end portions, from which coatings are removed, of said two optical fibers held by said holder tables are fitted, and fiber clamps capable of rotating from their waiting positions to positions above said guide grooves and adapted to press said tip end portions of said optical fibers, which are fitted in the guide grooves, into said guide grooves, said screening mechanism comprising:

a sensor capable of detecting the fact that the pressing of said tip end portions of said optical fibers effected by said fiber clamps is released; and wherein when the releasing is detected by said sensor, one or both of said two holder tables are automatically shifted in directions opposite to optical fiber abutting directions to pull said optical fibers, thereby effect screening.

2. An screening mechanism for an optical fiber fusion-splicer according to claim 1, wherein two optical fibers to be fusion-spliced are set on two fiber holders independently, and said fiber holders are mounted on said two holder tables.

3. An screening mechanism for an optical fiber fusion-splicer according to claim 1 or 2, wherein the fact that the pressing of said tip end portions of said optical fibers effected by said fiber clamps is released is detected by detecting the fact that said fiber clamps are returned to their waiting positions.

* * * * *